May 11, 1926.
E. H. ANGLE
1,584,501
ORTHODONTIC APPLIANCE
Filed Dec. 3, 1925    2 Sheets-Sheet 1
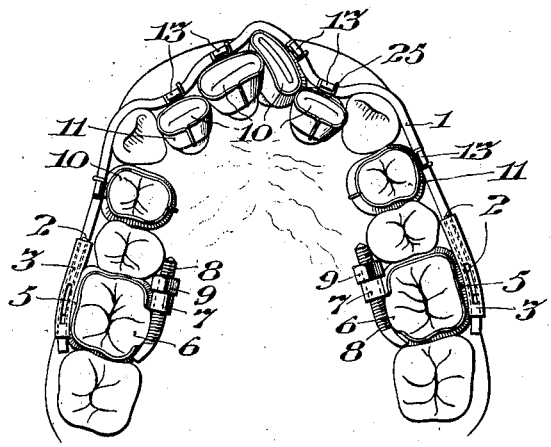
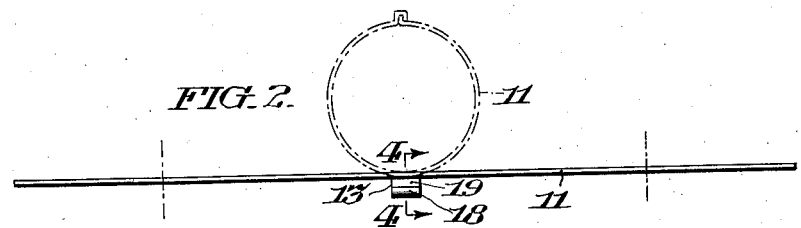
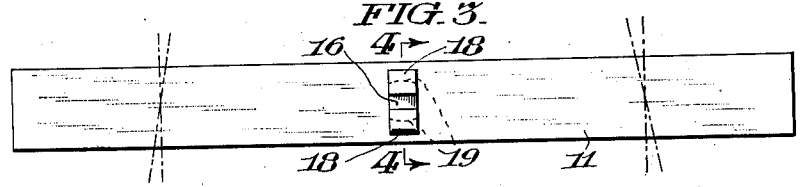
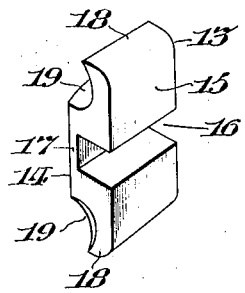
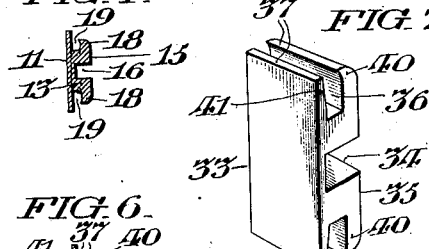
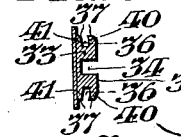
Inventor
Edward H. Angle,
By
Attorney May 11, 1926.
E. H. ANGLE
ORTHODONTIC APPLIANCE
Filed Dec. 3, 1925
1,584,501
2 Sheets-Sheet 2
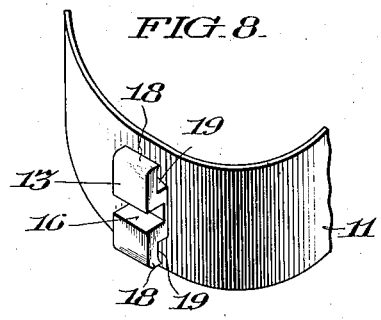
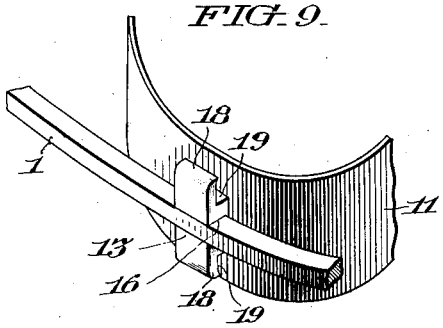
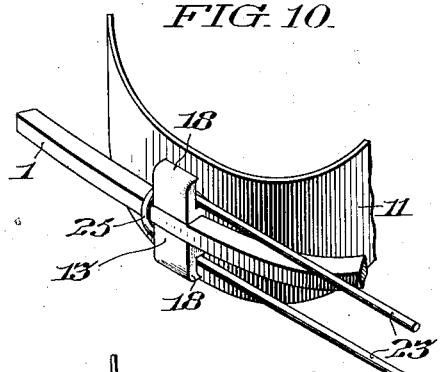
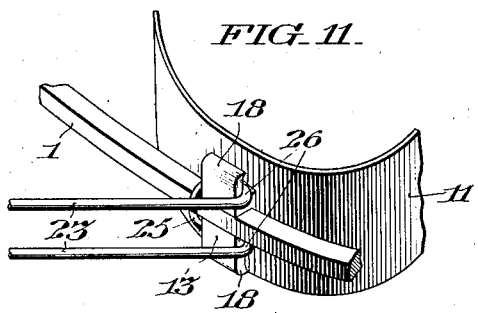
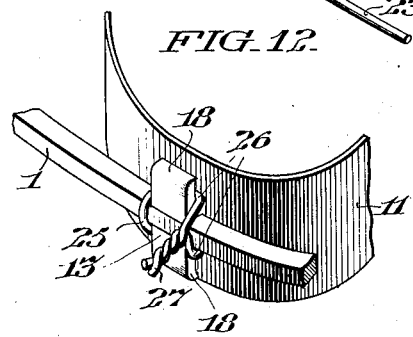
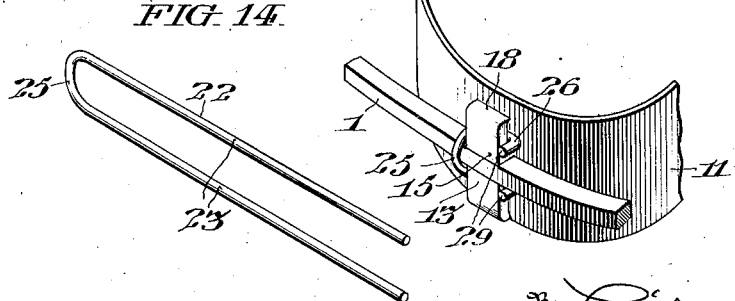
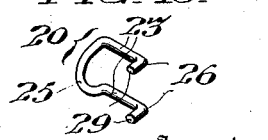
Inventor
Edward H. Angle,
By Clifton C. Hallowell
Attorney Patented May 11, 1926.

1,584,501

UNITED STATES PATENT OFFICE.

EDWARD H. ANGLE, OF PASADENA, CALIFORNIA.

ORTHODONTIC APPLIANCE.

Application filed December 3, 1925. Serial No. 72,873.

My invention is applicable to the art of correcting the position of malposed teeth of the dental arch, and particularly relates to that class of devices in which an arch-bar is adjustably supported at its opposite terminals by anchorages clamped to suitably disposed posterior teeth or molars, and is especially directed to the means by which said arch-bar is connected, intermediate of its ends, with selected teeth of the dental arch.

The principal objects of my invention are to provide a tooth engaging band with an arch-bar attaching bracket of such proportions and of such reduced bulk, or size, as to afford a minimum interference with the lips and cheeks, whereby a consequent lessening of discomfort and inconvenience to the wearer is effected.

Other objects of my invention are to provide the tooth-band with a bracket that is so constructed and arranged as to afford such a reinforcement for said band as to require no supplemental stiffening or thickening of the tooth-band as has been commonly employed.

My invention comprehends an arch-bar attaching bracket, the construction of which is ideally adapted to be conveniently soldered to the tooth-band, and to afford such a tenacious attachment therewith, that any possible movement of the tooth, to which the band may be fitted, may be effected without danger of distortion or fracture of the appliance.

Further objects of my invention are to provide a tooth-band with a bracket having means cooperative to so firmly lock an arch-bar therein as to insure the firm, accurate and positive movements of either the crown or root of a tooth in any desired direction, and thereby so facilitate the cooperative action of the arch-bar that it may as readily effect the movement of teeth lingually, labially and buccally, or they may be rotated or tipped transversely with respect to their axes, and may be as readily forced laterally in the direction of the length of the arch-bar with equal accuracy of movement.

My invention includes a tooth-band bracket having lateral undercuts forming projections over which a looped ligature may be passed and drawn taut by a single movement of the hand of the operator to engage an arch-bar with said bracket.

The form of my invention as hereinafter described, comprises a tooth-band provided with a bracket having a slot opening outwardly from said tooth-band, and arranged to receive an arch-bar snugly fitted therein, and having lateral grooves or undercuts affording projections serving as hooks over and behind which a looped ligature, forming a retaining lock, may be passed and so twisted as to draw the loop taut about the arch-bar and thereby firmly retain it in its slot in said bracket.

My invention also includes all of the various novel features of construction and arrangement as hereinafter more definitely specified.

In the accompanying drawings, Figure 1 is an inverted plan view of the upper human dental arch, showing a convenient embodiment of my invention attached to selected teeth of said dental arch; Fig. 2 is an enlarged plan view of one of the tooth attachments comprising a tooth-band extended in a plane and an arch-bar attaching bracket, constructed according to my invention, attached thereto; Fig. 3 is a front elevational view of the tooth attachment shown in Fig. 2; Fig. 4 is a transverse sectional view of said tooth attachment, taken on the line 4—4 in Figs. 2 and 3; Fig. 5 is a greatly enlarged perspective view of the bracket per se, which is shown in Figs. 2, 3 and 4 attached to the tooth-band; Fig. 6 is a transverse sectional view similar to Fig. 4, but showing a slight modification of the bracket; Fig. 7 is a greatly enlarged perspective view of the bracket per se, which is shown in Fig. 6 attached to the tooth-band; Fig. 8 is an enlarged fragmentary perspective view of the formed tooth-band with its arch-bar attaching bracket secured thereto; Fig. 9 is a perspective view similar to Fig. 8, but showing a fragment of the arch-bar operatively engaged in the attaching bracket; Fig. 10 is a perspective view similar to Fig. 9, but showing the wire ligature forming the lock looped over the arch-bar and behind the projections or hooks formed by the lateral undercuts and extended therefrom in position to effect the drawing of the loop taut; Fig. 11 is a perspective view similar to Fig. 10, but showing the free ends of the looped wire ligature drawn backwardly to form loop retaining bends therein; Fig. 12 is a perspective view similar to Fig. 11, but showing the free ends of the looped wire ligature twisted to exert tension on the loop and thereby so rigidly lock the arch-bar as to prevent its relative movement with respect to the bracket; Fig. 13 is a perspective view similar to Fig. 12, but showing the twisted ends of the wire ligature clipped off, leaving the laterally bent projecting ends of the wire ligature to hold the loop under tension; Fig. 14 is a perspective view of the looped wire ligature in the form best adapted to be conveniently engaged with the bracket; and Fig. 15 is a perspective view of the wire ligature lock per se, in its ultimate form as shown in Fig. 13, to retain the arch-bar in locked engagement with the bracket.

The tooth regulating appliance to which this invention is especially applicable is indicated in a general way in Fig. 1, and includes, together with associated parts, an arch-bar 1 bent to substantially conform to the dental arch and having its extremities provided with tangs 2 and extended through anchor sheaths 3, with which said tangs may be engaged to retain the arch-bar 1 in adjusted position, and which are carried by the anchor-bands 5, of well known construction.

As shown in Fig. 1, the anchor bands 5 are attached to the first molar teeth 6, which serve as anchor abutments upon opposite sides of the dental arch, said bands being provided with an eye 7 at one end, and at the other end, a threaded stem 8 extended through said eye and arranged to be adjusted therein by the nut 9 to clamp the band 5 upon said abutment teeth 6, as is obvious.

The gist of my invention resides in the means of securing the arch-bar 1 to the malposed teeth 10 in the dental arch, and comprises the tooth-band 11 and its arch-bar attaching bracket 13, shown in Figs. 2 and 3 in its initial form extended in a plane, and arranged to be cut to the length desired as indicated by the transverse dot-and-dash lines or the oblique dash lines thereon shown, and formed into the tooth embracing ring as shown by the circular dot-and-dash lines as indicated in Fig. 2.

As best shown in Figs. 4 and 5, the bracket 13 may be of substantially rectangular form, having its rear face 14 providing an uninterrupted plane surface which amply affords a tenacious solder joint when engaged with the tooth-band 11.

The front or outer wall 15 of the bracket 13 is provided with the deeply cut or depressed slot 16 extending transversely through the body of said bracket and in parallel relation to the length of said tooth-band, and so nearly bisecting the bracket body as to afford but a relatively thin web 17, sufficient only to insure the required rigidity, yet permitting the arch-bar to so closely approach the tooth-band as to conserve space and thereby minimize the extent of projection of the regulating appliances in the mouth of the patient.

The bracket 13 is also provided with oppositely directed lateral undercut projections 18 affording hooks formed by the recesses 19, which may be in the form of slots, or grooves, and which extend parallel with the arch-bar slot 16 upon opposite sides thereof, and which are arranged to receive the arch-bar lock 20 shown in Fig. 15, conveniently applied and formed as shown in Figs. 8 to 13 inclusive, from wire ligature 22 shaped, as shown in Fig. 14, into the form of a staple or hairpin having its legs 23 extended parallel from its loop 25.

It may be noted that the wire ligature formed as shown in Fig. 14 may be engaged with the bracket by forcing the loop 25 over the lateral projections 18 and by a single forward movement in the direction of the legs 23 of the formed ligature wire 22, the loop may be drawn taut with the ligature extended over the arch-bar 1 and behind the lateral projections 18 of the bracket 13.

As shown in Fig. 8, the slot 16 in the bracket 13, opens outwardly from the tooth-band and consequently affords convenient access thereto for the easy manipulation of the arch-bar with respect thereto, irrespective of the shape and position of said arch-bar which is shown engaged in the slot in Fig. 9.

As shown in Fig. 10, the arch-bar thus adjusted is engaged by the loop 25 of the lock structure shown in Fig. 14, the legs 23 being forced over the lateral projections 18 and into the recesses 19, and pulled in the direction of their free extremities to draw the loop 25 taut over the arch-bar as indicated.

As shown in Fig. 11, the legs 23 of the lock structure are turned backwardly to form the loop retaining bends 26, and in this position the parallel strands of the wire ligature are twisted together to form in effect a tourniquet 27, as shown in Fig. 12, and thereby further tighten the loop 25 and the retaining bends 26.

As shown in Fig. 13, the twisted strand 27 is clipped flush with the outer face 15 of the bracket 13, thereby leaving the outwardly extending retaining prongs 29, of the arch-bar retaining lock, which is more clearly illustrated separately in Fig. 15.

In the form of my invention shown in Figs. 6 and 7, the bracket 33 is provided with the arch-bar slot 34 in its outer face 35, and the lock receiving slots 36 in its lateral faces 37, extended parallel with the slot 34 upon opposite sides thereof, and through which the legs or prongs 23 of the lock may be extended, and said slots correspond to the recesses 19 in Figs. 4 and 5.

In the form of bracket shown in Figs. 6 and 7, the slots 36 not only afford the projecting hooks 40 behind which the ligature may be engaged, but also affords the flanges 41 providing an uninterrupted plane surface coextensive with the extreme dimensions of said bracket, which not only affords a tenacious solder joint with the tooth-band 11 but also provides such a reinforcement for said tooth-band as to eliminate the necessity of any auxiliary reinforcement as heretofore employed.

My invention is advantageous in that the bracket serves as a reinforcement affording a maximum solder attaching surface, and provides a uniform three-surface engagement with the arch-bar, which snugly fits therein, and which may be readily shaped and adjusted to engage therewith from the outer side thereof.

Furthermore, the bracket attachment affords such a positive locking means comprising the ligature wire lock, that said arch-bar may be so rigidly engaged with the bracket as to insure an ideal torque power in any desired direction, whereby the movement of the tooth roots either labially or lingually, and the tipping mesially or distally of the crowns and roots, as well as the rotation of the tooth, may be effected with equal facility. In fact, every possible desired movement of the teeth may be readily accomplished thereby.

I do not desire to limit my invention to the precise details of construction and arrangement as herein set forth, as it is obvious that various modifications may be made therein without departing from the essential features of my invention as defined in the appended claims.

Having thus described my invention, I claim:

1. An orthodontic appliance comprising a tooth-band bracket having an arch-bar receiving slot in its outer face, and having its oppositely directed lateral faces recessed to form projections extending away from said slot.

2. An orthodontic appliance comprising a tooth-band bracket having an arch-bar receiving slot in its outer face, and having undercut recesses extending longitudinally through the lateral faces of said bracket.

3. An orthodontic appliance comprising a tooth-band bracket having an arch-bar receiving slot in its outer face, and having lateral projections affording recesses serving as guides upon opposite sides of said slot and opening outwardly therefrom.

4. An orthodontic appliance comprising a tooth-band bracket having parallel slots respectively disposed in its outer face and in its lateral faces.

5. An orthodontic appliance comprising a tooth-band bracket having parallel slots respectively disposed in three of its adjacent intersecting faces.

6. An orthodontic appliance comprising a tooth-band bracket having an arch-bar slot in its outer face and having oppositely directed flanges extended laterally away from the sides of said slot in a plane with the rear face of said bracket, and having similar flanges extended laterally substantially in the plane of said outer face of said bracket.

In witness whereof, I have hereunto set my hand this 14 day of November, A. D. 1925.

EDWARD H. ANGLE.